(12) United States Patent
Hackworth et al.

(10) Patent No.: US 10,340,677 B1
(45) Date of Patent: Jul. 2, 2019

(54) FLEXIBLE ELECTRICAL CONTACT MODULE

(71) Applicant: NDI Engineering Company, Thorofare, NJ (US)

(72) Inventors: Donald T. Hackworth, Monroeville, PA (US); Michael J. Mielnik, Palmyra, VA (US)

(73) Assignee: NDI Engineering Company, Thorofare, NJ (US)

( * ) Notice: Subject to any disclaimer, the term of this patent is extended or adjusted under 35 U.S.C. 154(b) by 50 days.

(21) Appl. No.: 15/840,402

(22) Filed: Dec. 13, 2017

Related U.S. Application Data (60) Provisional application No. 62/434,160, filed on Dec. 14, 2016.

(51) Int. Cl.
| | |
|---|---|
| *H02G 5/00* | (2006.01) |
| *H02G 5/02* | (2006.01) |
| *H01R 39/64* | (2006.01) |
| *H01R 25/16* | (2006.01) |
| *H01R 4/58* | (2006.01) |

(52) U.S. Cl.
CPC ............. *H02G 5/005* (2013.01); *H01R 4/58* (2013.01); *H01R 25/162* (2013.01); *H01R 39/64* (2013.01); *H02G 5/025* (2013.01)

(58) Field of Classification Search
CPC .......... H02G 5/005; H02G 5/025; H01R 4/58; H01R 25/162; H01R 39/64
See application file for complete search history.

(56) References Cited

U.S. PATENT DOCUMENTS

| | | | | |
|---|---|---|---|---|
| 3,614,297 | A * | 10/1971 | Carlson | H02G 5/06 174/117 FF |
| 5,052,953 | A | 10/1991 | Weber | |
| 5,173,677 | A * | 12/1992 | Dederer | H01F 6/00 335/216 |
| 6,471,538 | B2 | 10/2002 | Zhou et al. | |
| 6,581,276 | B2 | 6/2003 | Chung | |
| 6,974,329 | B2 | 12/2005 | Henneberg | |
| 7,008,260 | B2 | 3/2006 | Diekmann | |
| 7,104,812 | B1 | 9/2006 | Bogiel et al. | |
| 7,113,408 | B2 | 9/2006 | Brown et al. | |
| 7,381,105 | B2 | 6/2008 | Miekka | |
| 7,419,407 | B1 * | 9/2008 | Jolly | H01R 13/2435 439/714 |
| 8,044,502 | B2 | 10/2011 | Rathburn | |
| 8,299,883 | B2 | 10/2012 | Katsumata et al. | |
| 8,701,539 | B1 * | 4/2014 | Dreizin | F41B 6/00 124/3 |
| 9,040,837 | B2 | 5/2015 | Takahashi et al. | |
| 2006/0273683 | A1 * | 12/2006 | Caprio | H02K 17/165 310/211 |
| 2007/0202714 | A1 | 8/2007 | Sherry | |

(Continued)

FOREIGN PATENT DOCUMENTS

TW   200950219 A   12/2009

*Primary Examiner* — Hoa C Nguyen
*Assistant Examiner* — Amol H Patel
(74) *Attorney, Agent, or Firm* — RatnerPrestia (57) ABSTRACT

A system for conducting electricity including a first body, a second body configured to move relative to the first body in a primary movement direction, and one or more electrical contact modules disposed between and in contact with the first body and the second body.

16 Claims, 12 Drawing Sheets

(56) References Cited

U.S. PATENT DOCUMENTS

| | | | |
|---|---|---|---|
| 2013/0003265 A1* | 1/2013 | Rodrigues | H02G 5/06 |
| | | | 361/675 |
| 2016/0218574 A1* | 7/2016 | Mundhas | H02K 1/278 |
| 2017/0229854 A1* | 8/2017 | Torgersen | H02G 5/00 |
| 2018/0062472 A1* | 3/2018 | Takei | H02K 1/04 |

* cited by examiner

FLEXIBLE ELECTRICAL CONTACT MODULE

CROSS REFERENCE TO RELATED APPLICATION

This application claims priority to U.S. Provisional Patent Application No. 62/434,160, filed Dec. 14, 2016, which is incorporated by reference herein in its entirety and for all purposes.

FIELD OF THE INVENTION

This invention relates to an electrical contact module for conducting electricity.

BACKGROUND OF THE INVENTION

Described herein are electrical contact modules including conductive laminations for use with electromagnetic systems, such as an electromagnetic projectile launcher, or a directed energy device, such as a laser or high energy radar. It should, be understood that the invention disclosed herein is not limited for use with electromagnetic projectile launchers, lasers or high energy radars and may be used with any system for conducting electricity.

SUMMARY OF THE INVENTION

One aspect of the invention comprises a system for conducting electricity, the system comprising a first body, a second body configured to move relative to the first body in a primary movement direction, and one or more electrical contact modules disposed between and in contact with the first body and the second body. Each electrical contact module comprises a plurality of laminations, each lamination comprising a metal sheet having a central longitudinal portion aligned on a first plane, a first plurality of fingers extending outward from the central longitudinal portion and aligned on a second plane angled relative to the first plane at a first angle. A second plurality of fingers extends outward from the central longitudinal portion and is aligned on a third plane angled relative to the first plane at an angle supplementary to the first angle. The lamination has an arrow or chevron shape from an end view, with each pair of longitudinally adjacent fingers separated from one another by a gap. At least a first clamping bar and a second clamping bar parallel to the central longitudinal sections of the plurality of laminations are disposed to compressively hold the plurality of laminations together in a stack disposed between the clamping bars along a clamping axis disposed orthogonal to the primary movement direction. Each lamination is separated from an adjacent lamination in the stack by a shim having a thickness that defines a space between parallel fingers of the adjacent laminations.

With respect to the individual module characteristics, the first clamping bar, the stack of laminations, and the second clamping bar of the electrical contact module may be compressively held together by a pair fasteners extending between the first clamping bar and the second clamping bar. In some embodiments, the electrical contact module may comprise a single plurality of laminations all disposed with their respective chevron shapes pointing in a first direction along the stack. In other embodiments, the electrical contact module comprises a middle clamping bar disposed between the first clamping bar and the second clamping bar, and a first plurality of laminations stacked between the first clamping bar and the middle clamping bar with their respective chevron shapes pointing in a direction toward the middle clamping bar, and a second plurality of laminations stacked between a second clamping bar and the middle clamping bar with their respective chevron shapes pointing toward the middle clamping bar in a direction opposite the first plurality of laminations.

In some embodiments, the movement of the second body relative to the first body may be primarily translational, whereas in other embodiments, the movement may be primarily rotational. An embodiment in which the movement is primarily translational may comprise a plurality of electrical contact modules disposed in an array, which may comprise a single row of modules or a plurality of rows and columns of modules. An embodiment in which the movement is primarily rotational may comprise a plurality of electrical contact modules disposed in a circular contactor ring, wherein the first body comprises an inner cylinder of a pair of coaxial cylinders configured to rotate relative to one another and the second body comprises an outer cylinder of the pair of coaxial cylinders, the contactor ring arranged in an annular space defined by an inner surface of the outer cylinder and an outer surface of the inner cylinder, the first set of fingers of each module in contact with the inner surface of the outer cylinder, and the second set of fingers of each module in contact with the outer surface of the inner cylinder. Each of the plurality of fingers in each of the plurality of laminations may extend from the central longitudinal portions at a length selected to match a contour of the inner surface of the outer cylinder or a contour of the outer surface of the inner cylinder. Such an embodiment may comprise a plurality of circular contactor rings disposed between the inner cylinder and the outer cylinder.

In certain embodiments, the system may be configured to conduct electrical current greater than 1 million Amps in a pulse of a duration less than one second.

BRIEF DESCRIPTION OF THE DRAWING FIGURES

For the purpose of illustration, there are shown in the drawings certain embodiments of the present invention. It should be understood, however, that the invention is not limited to the precise components, arrangements, dimensions, and instruments shown. Like numerals indicate like elements throughout the drawings. In the drawings.

DETAILED DESCRIPTION OF THE INVENTION

Various terms are used throughout the disclosure to describe the physical shape or arrangement of features. A number of these terms are used to describe features that conform to a cylindrical or generally cylindrical geometry characterized by a radius and a center axis perpendicular to the radius. Unless a different meaning is specified, the terms are given the following meanings. The terms "longitudinal", "longitudinally", "axial" and "axially" refer to a direction, dimension or orientation that is parallel to a center axis. The terms "radial" and "radially" refer to a direction, dimension or orientation that is perpendicular to the center axis. The terms "inward" and "inwardly" refer to a direction, dimension or orientation that extends in a radial direction toward the center axis. The terms "outward" and "outwardly" refer to a direction, dimension or orientation that extends in a radial direction away from the center axis.

One aspect of the invention comprises a single direction electrical contact module 2, such as is shown in FIGS. 1A-1D.

Figure 1A:
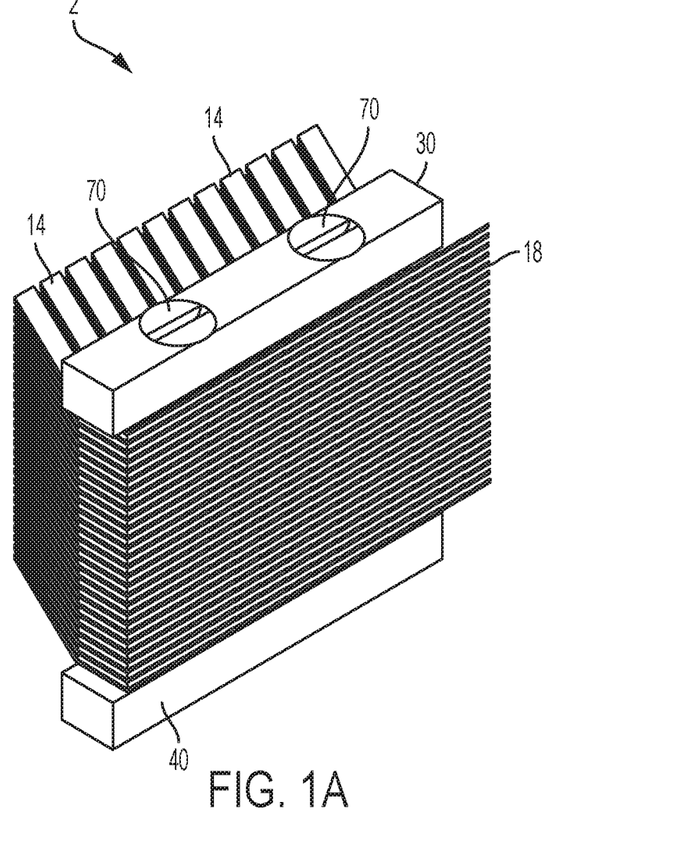
FIG. 1A is an isometric view of a single direction electrical contact module, which is shown schematically, according to an exemplary embodiment of the invention.
Figure 1B:
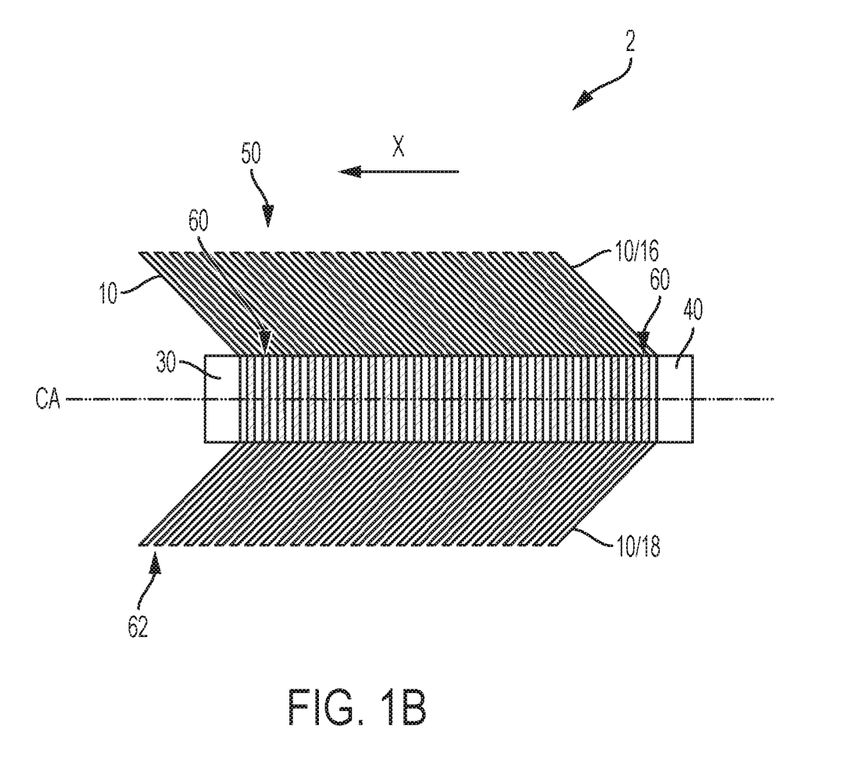
FIG. 1B is a right side elevation view of the single direction electrical contact module of FIG. 1A.
Figure 1C:
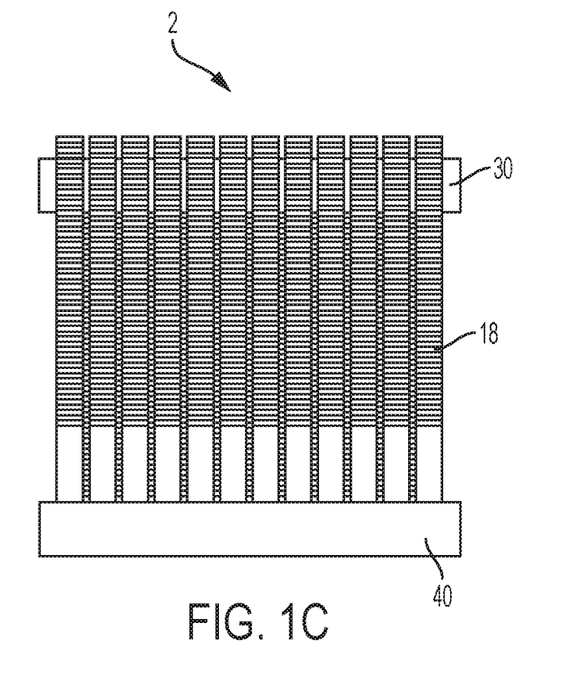
FIG. 1C is a front side elevation view of the single direction electrical contact module of FIG. 1A.
Figure 1D:
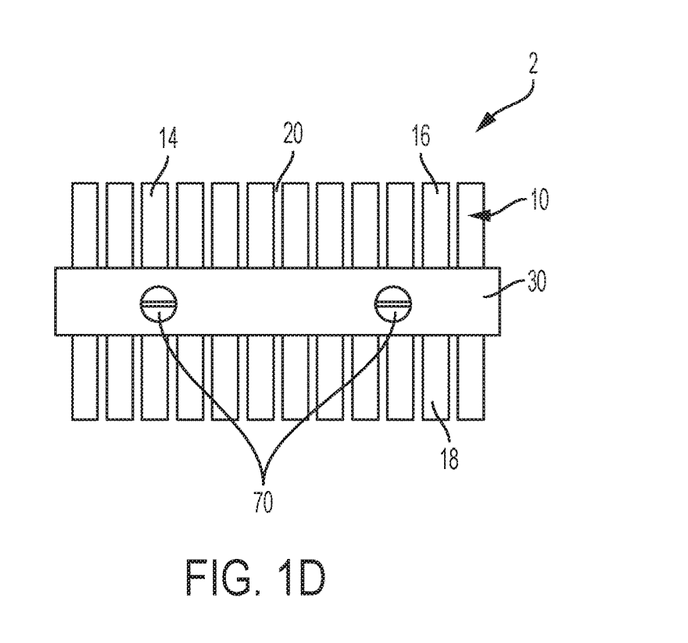
FIG. 1D is a top plan view of the single direction electrical contact module of FIG. 1A.
Figure 2:
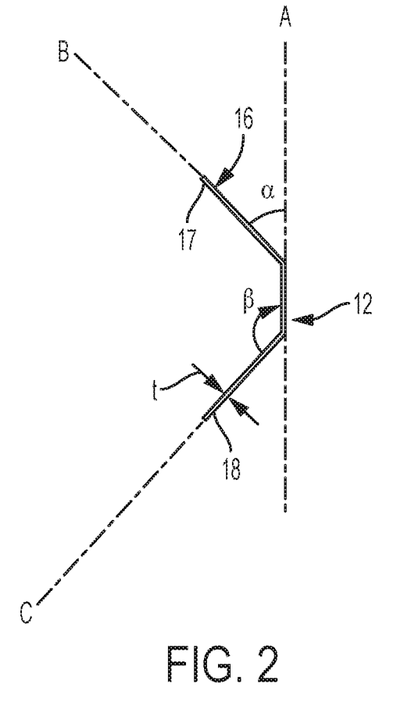
FIG. 2 is a right side elevation view of a single lamination of the single direction electrical contact module of FIGS. 1A-1D.
Figure 3:
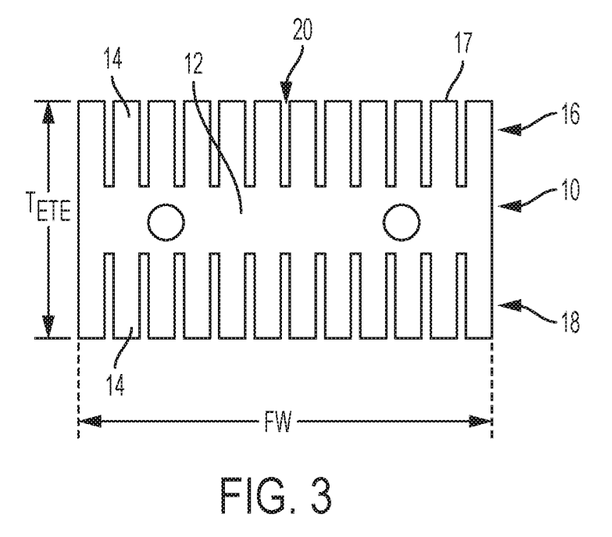
FIG. 3 is a top plan view of the single lamination of FIG. 2.

The module 2 comprises a plurality of laminations 10, each lamination comprising a monolithic metal sheet having a face width FW, an end-to-end thickness $T_{ETE}$, and a central longitudinal portion 12 aligned on a first plane A. A first plurality 16 of fingers 14 extend outward from the central longitudinal portion and are aligned on a second plane B angled relative to the first plane at a first angle α. A second plurality 18 of fingers 14 extend outward from the central longitudinal portion and are aligned on a third plane C angled relative to the first plane at an angle supplementary to the first angle β such that the lamination has a chevron shape from an end view, such as FIG. 2.

Each pair of longitudinally adjacent fingers 14 is separated from one another by a gap 20. The width of gap 20 (i.e. the distance longitudinally adjacent fingers) may be the same for each pair of fingers 14, or the gap 20 may be different between some fingers 14 than between others. For example, the gap 20 may be larger on fingers 14 closer to the outer edges of the laminations 10 than those in the interior, or vice versa. The free ends 17 of each finger 14 may be machined to match the contour of the surfaces in which they are positioned in contact (such as the outer cylinder 204 of FIG. 6).

As used herein the term "lamination" is intended only to refer to a single sheet of the plurality of sheets comprising the contact module, and does not suggest or imply that adjacent sheets are to be bonded or otherwise connected to one another across their entire opposing surfaces, such as by a lamination process. Each sheet may also be referred to as a "chevron" in this particular embodiment, but such reference is not intended to limit the sheet to any particular geometry.

At least a first clamping bar 30 and a second clamping bar 40 are arranged parallel to the central longitudinal sections of the plurality of laminations and are disposed to compressively hold the plurality of laminations together in a stack 50 disposed between the clamping bars 30 and 40. The clamping bars 30 and 40 each have a rectangular shape and may be composed of stainless steel, for example.

The central longitudinal sections of each pair of adjacent laminations 10 in the module 2 are separated from one another in the stack by a rectangular shaped shim 60. In an assembled form of the module 2, each shim 60 has a thickness that defines a space 62 between parallel fingers 14 of the adjacent laminations 10. Each shim 60 in the stack may have the same thickness, or some shims 60 may have a greater thickness than others. For example, shims 60 relatively nearer to the clamping bars 30 and 40 may be relatively thicker than those relatively nearer the center of the stack 50, or vice versa.

The first clamping bar 30, the stack 50 of laminations 10, the shims 60 and the second clamping bar 40 may be compressively held together by a pair of fasteners 70 extending between the first clamping bar 30 and the second clamping bar 40. The fasteners 70 impart a compressive force on the module 2 and along clamping axis CA. Each of the shims 60, the laminations 10, and the clamping bars 30 and 40 have holes through which the fasteners 70 pass. The holes in the clamping bar 30 may be countersunk to accommodate the head of each fasteners 70, such that the head of each fastener 70 is substantially flush with the surface of the clamping bar 30. Those skilled in the art will recognize that other ways exist for mounting the components of the module 2.

The module 2 is referred to herein as a "single direction contact module" because the plurality of laminations 10 are all disposed with their respective chevron shapes pointing in a first direction X (see FIG. 1B) along the clamping axis CA of the stack.

Figure 4:
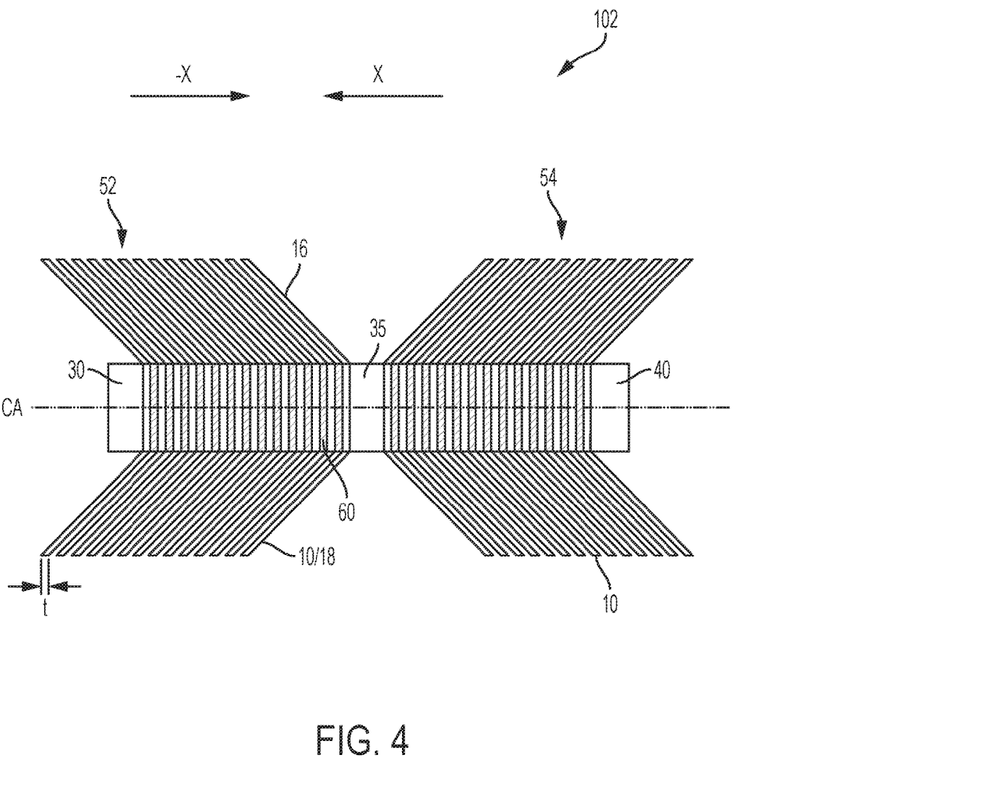
FIG. 4 is a right side elevation view of a dual direction electrical contact module, according to another exemplary embodiment of the invention.

FIG. 4 depicts a dual direction contact module 102 according to another exemplary embodiment of the invention. The module 102 is substantially similar to the module 2, and the primary differences therebetween will be described hereinafter.

The module 102 includes a middle clamping bar 35 disposed between the first clamping bar 30 and the second clamping bar 40. A first stack 52 of interleaved laminations 10 and shims 60 are disposed between the first clamping bar 30 and the middle clamping bar 35. The respective chevron shapes of the laminations 10 of the first stack 52 point in a direction (-X) toward the middle clamping bar 35. A second stack 54 of interleaved laminations 10 and shims 60 are disposed between the second clamping bar 40 and the middle clamping bar 35. The respective chevron shapes of the laminations 10 of the second stack 54 point toward the middle clamping bar 35 in a direction (X) opposite the first stack 52.

It should be understood that while the dual direction contact module 102 is identified as such because the resistance to relative movement of a body in contact with the fingers 14 when the movement is in the X direction is expected to be no greater than in the -X direction, and the single direction contact module 2 is so identified because it is expected to provide greater resistance to relative movement along the -X direction than in the X direction, both modules 2 and 102 may be designed to accommodate movement in either or both directions, and both may implemented in single or dual movement applications. Accordingly, the respective labels are not intended as a limitation upon use.

Furthermore, as shown in the figures, the modules 2 and 102 are preferably oriented in use such that the primary axis of movement is orthogonal to the clamping axis CA, and parallel to the face width (FW) dimension of the laminations 10, such that any physical resistance to primary motion of the body in contact with the fingers 14 is the same in both directions.

The angled orientation of the fingers 14 relative to the surface in which the fingers 14 are in contact permits the fingers 14 to be compressed enough so that they exert a spring force against the body in contact, which helps to maintain the electrical connection. Configurations may be designed with varying amounts of pre-load that may dictate the amount of spring force, which may, in turn dictate the amount of frictional resistance to movement of the contact body relative to the fingers 14. The orientation of the module 2, 102 may therefore dictate the resistance to axial movement. In general, because axial movement in the X direction for a single direction module 2 is likely to meet less resistance than in the opposite direction, the orientation in use may be determined based on this tendency. Similarly, in applications in which it is important for the resistance to axial motion to be the same in both directions, the dual direction module 102 may be more desirable. In general, however, the orientation of the module 2, 102 with the primary sliding motion orthogonal to the clamping axis and parallel to the face width (FW) of the laminations is most desirable.

Figure 5:
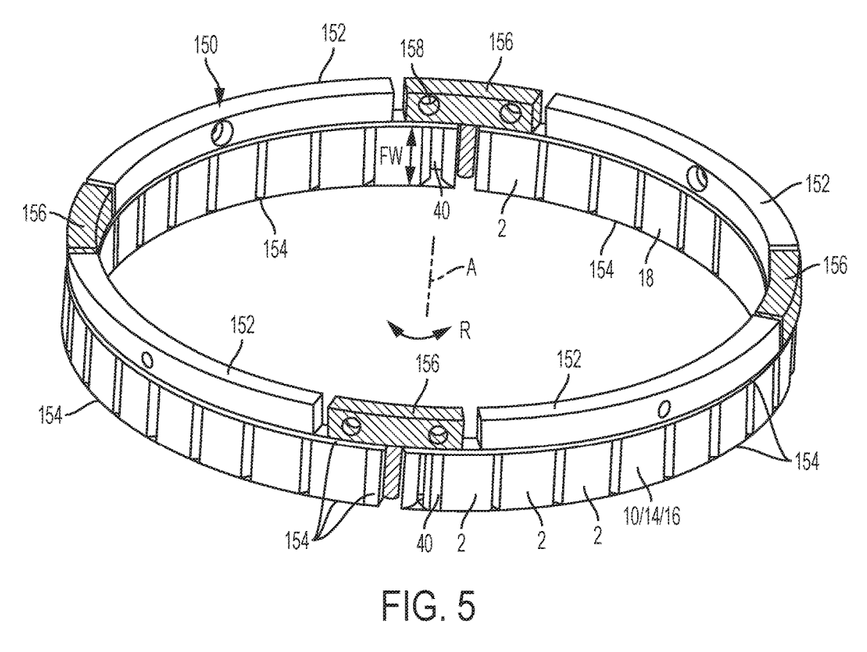
FIG. 5 is an isometric view of a contactor ring assembly comprising a plurality of the electrical contact modules of FIGS. 1A-1D.
Figure 6:
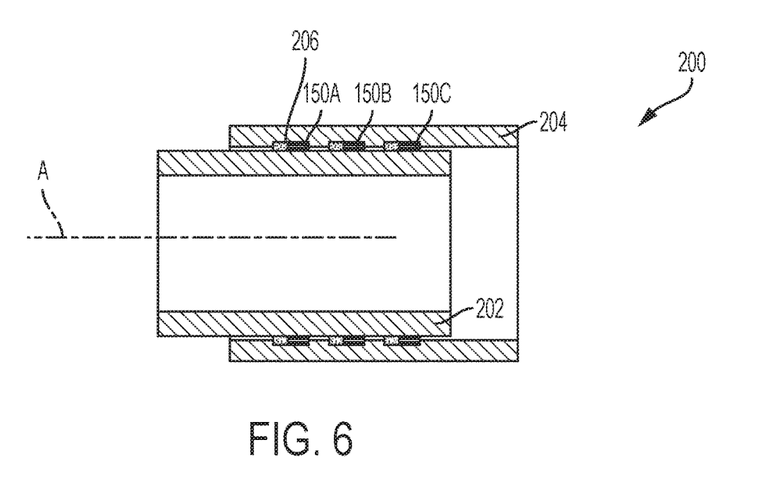
FIG. 6 is a cross-sectional elevation view of three of the contactor ring assemblies of FIG. 5 sandwiched between two cylinders.
Figure 7:
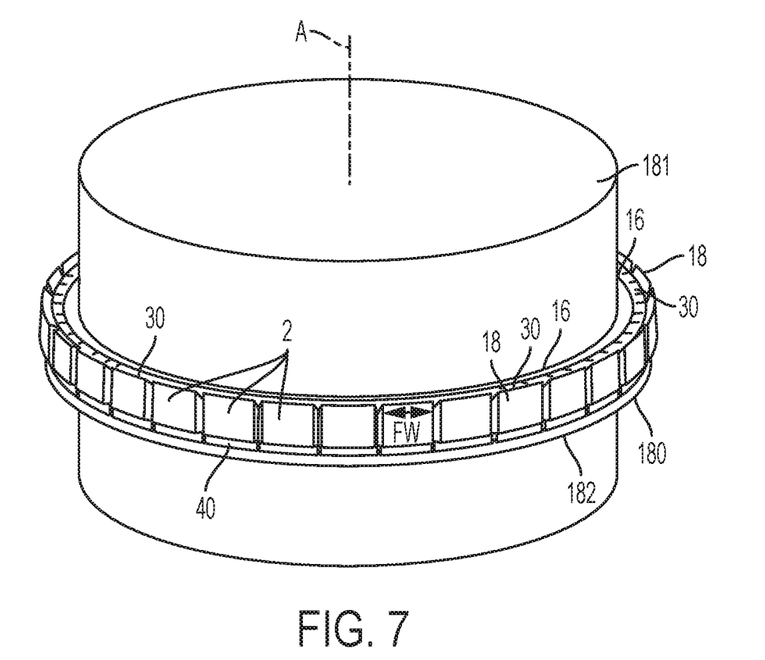
FIG. 7 is an isometric view of another contactor ring assembly mounted to an exterior surface of a cylinder and in an orientation preferable for supporting rotational motion.

Referring now to FIGS. 5-7, the modules 2 may be arranged in ring configurations to accommodate axial or rotational movement, or a combination of both axial and rotational movement. The orientation of the modules 2 in a ring configuration may be tailored to support the primary type of motion expected (e.g., rotational and/or axial). The modules 2 may be used in an application encompassing up to three degrees of freedom, for example, or more if desired.

FIG. 5 is an isometric view of a contactor ring assembly 150 comprising a plurality of electrical contact modules 2 of FIGS. 1A-1D. The electrical contact modules 2 of the contactor ring assembly 150 are arranged in an orientation preferable for supporting axial motion of the contactor ring assembly 150 along axis A.

The ring assembly 150 comprises four curved frames 154 (curved about axis A) that are arranged in a circle about axis A and connected together by four bearings 156. Each curved frame 154 defines a curved rectangular space. A plurality of electrical contact modules 2 are arranged side by side within the curved rectangular space of each frame 154 such that the longitudinal axis of the clamping bar 40 of each module 2 extends parallel to the axis A. A bearing spacer 152 is mounted to the top side of each curved frame 154. The bearing spacers 152 do not extend across the entire top surface of their respective frames 154 such that space remains on the top surface of the frames 154 for accommodating the bearings 156. Each bearing 152 and 156 has one or more transverse thru-holes 158 for mounting the bearings 152 and 156 to a cylinder to which they are attached.

The electrical contact modules 2, the frames 154, the bearings 156 and the bearing spacers 152 may be mounted together by fasteners, welds, adhesive or any other connection means that is known in the art. If so desired, the ring assembly 150 could also incorporate the electrical contact modules 102.

The bearing spacer 152 may be composed of stainless steel, for example. The bearings 156 may be composed of brass, for example. The bearings 152, 156 may not be used in all applications, dependent upon the geometry and dimensions of the application, and the material selected for the bearings 152, 156 is a function of the application and are not limited to brass and stainless steel. Those skilled in the art will recognize that the bearings 152 and 156 may be composed of other materials.

FIG. 6 is a cross-sectional elevation view depicting three of the contactor ring assemblies 150 (individually labeled 150A, 150B and 150C) shown sandwiched between an inner cylinder 202 and an outer cylinder 204. The contactor ring assemblies 150 may be maintained in an orientation preferable for supporting rotational motion and/or translational motion. The outer cylinder 204 includes a revolved recess 206 on its interior sidewall for accommodating the contactor ring assemblies 150.

In the arrangement shown in FIG. 6, the contactor ring assemblies 150 may be non-rotatably mounted to the inner cylinder 202 and/or the outer cylinder 204. A first plurality 16 of fingers 14 on one side of the module 2 are in contact with the inner surface of the outer cylinder 204, and a second plurality 18 of fingers 14 on the opposite side of the module 2 are in contact with the outer surface of the inner cylinder 202. Each of the plurality 16, 18 of fingers 14, in each of the plurality of laminations 10 may extend from the central longitudinal portions 12 at a length selected to match a contour of the inner revolved surface of the outer cylinder 204 or a contour of the outer revolved surface of the inner cylinder 202.

The inner cylinder 202 and outer cylinder 204 may be configured to rotate relative to one another. The cylinders 202 and 204 may also be configured to slide along axis A with respect to each other.

FIG. 7 is an isometric view of another contactor ring assembly 180 mounted to an exterior surface of a cylinder 181 and in an orientation preferable for supporting rotational motion. The contactor ring assembly 180 comprises a ring 182 and modules 2 mounted in a circular formation above the ring 182. In the contactor ring assembly 180, the second clamping bar 40 of each module 2 is mounted to the top side of the ring 182. The modules 2 are arranged side by side in a circle about the outer circumference of the cylinder 181. The contactor ring assembly 180 may be either rotatably or non-rotatably mounted to the cylinder 181.

The first plurality 16 of fingers 14 face the outer revolved surface of the cylinder 181, whereas, the second plurality 18 of fingers 14 are configured to face away from the cylinder 181. The second plurality 18 of fingers 14 may face the inner revolved surface of another cylinder (like cylinder 204). For the first plurality 16 of fingers 14, which face the cylinder 181, the fingers 14 that are closer to the longitudinal ends of the lamination 10 are longer than the fingers 14 that are positioned toward the center of the lamination 10. For the second plurality 18 of fingers 14, which face away from the cylinder 181, the fingers 14 that are closer to the center of the lamination 10 are longer than the fingers 14 that are closer to the ends of the lamination 10.

For each of the embodiments, the lengths of each of the plurality of fingers 14 may be set by machining the ends of the fingers 14, such as using Electrical Discharge Machining (EDM), to collectively define an outer machined surface and an inner machined surface. Notably, the use of EDM, preferably computer controlled EDM, may be highly desirable for use in all of the cutting operations involved in making the various components of the modules 2.

Figure 8:
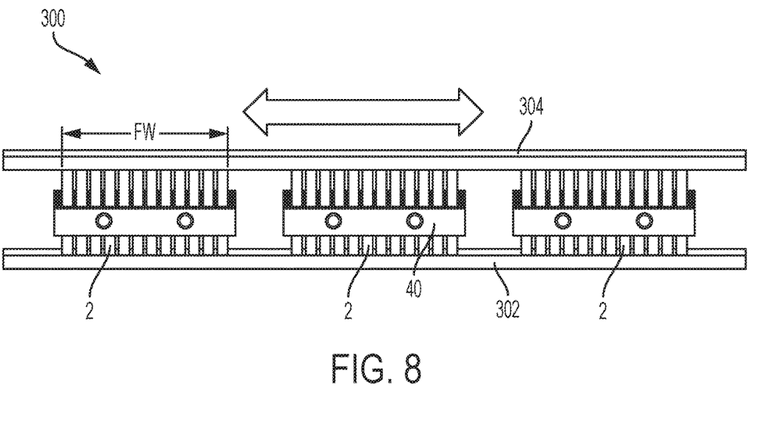
FIG. 8 is a schematic side view illustration of an exemplary array of electrical contact modules disposed in a grid arrangement configured for use in connection with bodies in relative translational movement with one another.
Figure 9:
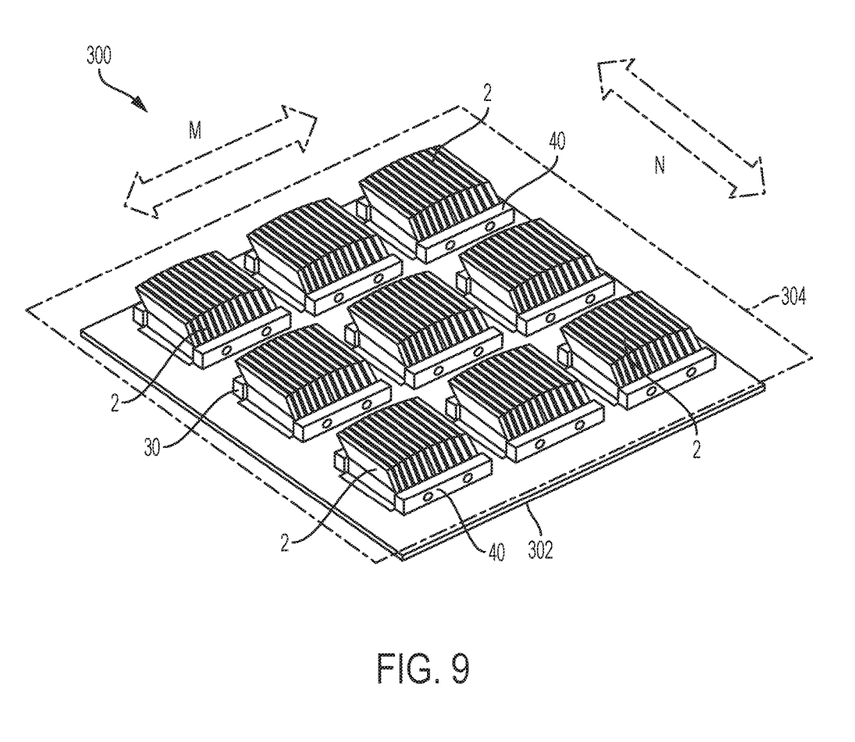
FIG. 9 is a schematic perspective view of the array of electrical contact modules of FIG. 8.

FIGS. 8 and 9 depict an exemplary system that comprises a plurality of modules 2 arranged in an array and sandwiched between and in positive contact with two plates 302 and 304. The plate 302 is stationary, whereas, the plate 304 is capable of sliding in directions M and/or N. The array may comprise three equally spaced rows of three equally spaced modules 2, as shown, or any number of rows containing any number of modules 2. The spacing between adjacent modules 2 may be either uniform or non-uniform.

The modules 2 are mounted to the stationary plate 302. The plate 302 may comprise non-conductive regions to isolate the plate 302 from any structures to which it is connected that would otherwise create the risk of an electrical short and/or to isolate each module 2 from the plate 302, depending on the demands of a particular application.

As best illustrated in FIG. 8, the face widths FW of the modules 2 are all oriented in the same direction, which is optimized for relative motion between the plates primarily along arrow N. It should be understood, however, that the system also supports motion along arrow M and that in certain applications, it may be desirable to include some modules oriented with their respective face widths parallel to the N direction, and others oriented with their respective face widths parallel to the M direction.

Additionally, it should be understood that although all of the modules depicted in FIGS. 5-9 are single direction modules 2, certain applications may include dual direction modules 102 or a combination of both single direction 2 and dual direction modules 102, depending upon the demands of a particular application.

It should also be understood that module orientations and the use of single and/or dual direction modules 2, 102 may be tailored to provide desired directional resistances or affinities for motion of the bodies contacted by the modules, dependent upon the demands of a specific application.

Some applications may include a plurality of interfaces, with one or more buses connecting a first interface with a second interface. In certain applications, the system may be configured to conduct electrical current greater than 1 million Amps (including in a range of 6 to 7 million Amps or higher) in a pulse of a duration less than one second, such as in a system configured to conduct current from a power source to a railgun. The modules 2 are not limited to any particular applications, however.

The current carrying capacity of the modules 2, 102 of the present invention are scalable to accommodate the power requirements of a particular application. In general, the current carrying capacity of a module is primarily a function of three factors: the number of laminations 10, the thickness (t) of each lamination, and the face width (FW) of the module assembly. The load bearing capacity of a given module is also dependent on these same three factors, as well as others, such as the angle of the chevron and the end-to-end thickness ($T_{ETE}$) of the module between the ends of the fingers 14 on one side to the ends of the fingers 14 on the other, as well as the properties of materials of construction used for the laminations 10.

In general, each module 2, 102 may be capable of sustaining several hundred pounds of mechanical contact loading, which far exceeds the load carrying capacity of normal contact brushes known in the art. For example, force loadings in excess of 150 pounds and in a general range of at least 150 to 600 pounds per module have been demonstrated with the exemplary module designs 2, 102 described herein, but variations in any of the factors noted above may result in lesser or greater force load carrying potential. This ability to handle such a load is a highly beneficial characteristic because of asymmetric loading such as may occur in ring applications as a result of runout tolerances between stationary and rotating cylinder during assembly and/or by bearing wear over time.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A system for conducting electricity, the system comprising a first body, a second body configured to move relative to the first body in a primary movement direction, and one or more electrical contact modules disposed between and in contact with the first body and the second body, each electrical contact module comprising:

a plurality of laminations, each lamination comprising a metal sheet having a central longitudinal portion aligned on a first plane, a first plurality of fingers extending outward from the central longitudinal portion and aligned on a second plane angled relative to the first plane at a first angle, and a second plurality of fingers extending outward from the central longitudinal portion and aligned on a third plane angled relative to the first plane at an angle supplementary to the first angle, such that the lamination has an arrow shape from an end view, each pair of longitudinally adjacent fingers separated from one another by a gap; and at least a first clamping bar and a second clamping bar parallel to the central longitudinal portions of the plurality of laminations and disposed to compressively hold the plurality of laminations together in a stack disposed between the clamping bars along a clamping axis disposed orthogonal to the primary movement direction, each lamination separated from an adjacent lamination in the stack by a shim having a thickness that defines a space between parallel fingers of the adjacent laminations.

2. The system of claim 1, wherein the first clamping bar, the stack of laminations, and the second clamping bar of the electrical contact module are compressively held together by a pair of fasteners extending between the first clamping bar and the second clamping bar.

3. The system of claim 1, wherein at least one of the one or more electrical contact modules comprises a single plurality of laminations all disposed with their respective arrow shapes pointing in a first direction along the stack.

4. The system of claim 3, wherein the one or more electrical contact modules consists of all electrical contact modules each comprising a single plurality of laminations all disposed with their respective arrow shapes pointing in a first direction along the stack.

5. The system of claim 1, wherein at least one of the one or more electrical contact modules comprises a middle clamping bar disposed between the first clamping bar and the second clamping bar, a first plurality of laminations stacked between the first clamping bar and the middle clamping bar with their respective arrow shapes pointing in a direction toward the middle clamping bar, and a second plurality of laminations stacked between the second clamping bar and the middle clamping bar with their respective arrow shapes pointing toward the middle clamping bar in a direction opposite the first plurality of laminations.

6. The system of claim 5, wherein the one or more electrical contact modules consists of all electrical contact modules each comprising the middle clamping bar, the first plurality of laminations and the second plurality of laminations.

7. The system of claim 1, wherein the movement of the second body relative to the first body is primarily translational movement.

8. The system of claim 1, wherein the movement of the second body relative to the first body is primarily rotational movement.

9. The system of claim 8, comprising a plurality of the electrical contact modules disposed in a circular contactor ring, wherein the first body comprises an inner cylinder of a pair of coaxial cylinders configured to rotate relative to one another and the second body comprises an outer cylinder of the pair of coaxial cylinders, the contactor ring arranged in an annular space defined by an inner surface of the outer cylinder and an outer surface of the inner cylinder, the first plurality of fingers of each module in contact with the inner surface of the outer cylinder, and the second plurality of fingers of each module in contact with the outer surface of the inner cylinder.

10. The system of claim 9, wherein each of the plurality of fingers in each of the plurality of laminations extends from the central longitudinal portions at a length selected to match a contour of the inner surface of the outer cylinder or a contour of the outer surface of the inner cylinder.

11. The system of claim 9, further comprising a plurality of circular contactor rings disposed between the inner cylinder and the outer cylinder.

12. The system of claim 1, wherein the system is configured to conduct electrical current greater than 1 million Amps in a pulse of a duration less than one second.

13. The system of claim 1, wherein the electrical contact modules are arranged in an array of rows and columns.

14. The system of claim 1, wherein the one or more electrical contact modules consists of a plurality of modules all having face widths oriented in a same direction.

15. The system of claim 1, wherein the one or more electrical contact modules comprises at least one module having a face width oriented in a first direction, and at least one module having a face width oriented in a second direction different than the first direction.

16. The system of claim 1, comprising:
at least one electrical contact module comprising a single plurality of laminations all disposed with their respective arrow shapes pointing in a first direction along the stack, and
at least one electric contact module comprising a middle clamping bar disposed between the first clamping bar and the second clamping bar, a first plurality of laminations stacked between the first clamping bar and the middle clamping bar with their respective arrow shapes pointing in a direction toward the middle clamping bar, and a second plurality of laminations stacked between the second clamping bar and the middle clamping bar with their respective arrow shapes pointing toward the middle clamping bar in a direction opposite the first plurality of laminations.

* * * * *